United States Patent [19]

Honda et al.

[11] Patent Number: 5,854,156
[45] Date of Patent: *Dec. 29, 1998

[54] GRANULATED POWDER FOR PRODUCING SILICON NITRIDE SINTERED BODY

[75] Inventors: Toshihiko Honda; Hisayoshi Nonaka, both of Nagoya, Japan

[73] Assignee: NGK Insulators, Ltd., Nagoya, Japan

[*] Notice: This patent issued on a continued prosecution application filed under 37 CFR 1.53(d), and is subject to the twenty year patent term provisions of 35 U.S.C. 154(a)(2).

[21] Appl. No.: 818,384

[22] Filed: Mar. 14, 1997

Related U.S. Application Data

[62] Division of Ser. No. 678,076, Jul. 10, 1996, abandoned.

[30] Foreign Application Priority Data

Jul. 11, 1995 [JP] Japan ................................ 7-174608

[51] Int. Cl.$^6$ ................................................ C04B 35/584
[52] U.S. Cl. .................... 501/97.1; 501/97.2; 501/97.3
[58] Field of Search ................. 501/97.1, 97.2, 501/97.3

[56] References Cited

U.S. PATENT DOCUMENTS

| 4,820,665 | 4/1989 | Ukai et al. ............................ 501/104 |
| 5,002,907 | 3/1991 | Hayakawa et al. ..................... 501/97 |
| 5,017,531 | 5/1991 | Ukai et al. .............................. 501/97 |
| 5,061,560 | 10/1991 | Tajima et al. ........................ 428/357 |
| 5,120,685 | 6/1992 | Quadir et al. ........................... 501/97 |
| 5,126,295 | 6/1992 | Uchino et al. .......................... 501/97 |
| 5,152,936 | 10/1992 | Tajima et al. .......................... 264/13 |
| 5,449,649 | 9/1995 | Li et al. ................................... 501/97 |
| 5,508,241 | 4/1996 | Yeckley .................................. 501/97 |
| 5,556,815 | 9/1996 | Boberski et al. ....................... 501/97 |

FOREIGN PATENT DOCUMENTS

| 40 13 923 A1 | 12/1990 | Germany . |
| 40 18 430 A1 | 1/1991 | Germany . |
| 1-261277 A | 10/1989 | Japan . |
| 6-340420 A | 12/1994 | Japan . |

OTHER PUBLICATIONS

J. Reed, Introduction to the Principles of Ceramic Processing, pp. 317–325, 1988.

*Primary Examiner*—Karl Group
*Attorney, Agent, or Firm*—Kubovcik & Kubocvik

[57] ABSTRACT

Granulated powder for molding produced by granulating material powder, whose variation factor (the standard deviation of strength/average strength) of the compressive strength of each granular particles composing granulated powder is 0.3 or less. By using granulated powder for molding of the present invention, sintered bodies with preferred properties, in particular with high strength can be produced stably.

1 Claim, No Drawings

GRANULATED POWDER FOR PRODUCING SILICON NITRIDE SINTERED BODY

This application is a division of application Ser. No. 08/678,076, filed Jul. 10, 1996, now abandoned.

BACKGROUND OF THE INVENTION

1. Field of the Invention

The present invention relates to granulated powder used as a material for, e.g., press molding in the manufacture of ceramic products.

2. Description of the Related Art

In the manufacture of ceramic products, when press molding such as mold press molding and CIP molding is used, starting material powder (average particle diameter: 0.5–1.0 $\mu$m, shape: undefined) is granulated to form granules (average particle diameter: 50–100 $\mu$m, shape: spherical), which are used as the material for molding. (Hereafter, the granulated material powder is called "granulated powder", and each granular particle composing the granulated powder is called "granular particle".)

In a general method for producing granulated powder, a slurry formed by dispersing starting material powder in a liquid such as water and alcohol, to which 3 to 5 percent by weight of an organic material for granulating such as a binder, lubricant and plasticizer is granulated using a spray dryer and the like. Granulated powder thus produced is molded, treated to remove the binder, and sintered to produce a sintered product.

Conventionally, for such granulated powder for press molding, the fluidity, particle size distribution, tapping density and moisture content of granulated power have been important from the point of view of mold filling, and the dimensional accuracy and density of molded products.

However, if sintered bodies are produced using the granulated powder prepared as described above, difference in properties (particularly mechanical strength) between resultant sintered bodies, even if they are produced using granulated powder with almost the same powder properties regarded as important (the fluidity, particle size distribution, tapping density and moisture content of granulated power) prepared from the same starting material powder.

The inventors of the present invention investigated the cause of such difference in the properties of sintered bodies, and found that the variation factor (the standard deviation of strength/average strength) of compressive strength of each granular particle composing the granulated powder affected the properties of sintered bodies, and if granulated powder with a large variation factor was used, the properties of the sintered bodies might lower. The reason for this is considered as follows:

If the variation factor of the compressive strength of granulated powder is large, that is, if granular particles which are collapsed even if a small force is applied, and granular particles which do not be collapsed unless a large force is applied coexist, the part of the granular particles which have been collapsed due to a small force may constitute a barrier against the transfer of pressure when a pressure is applied for molding, and the pressure may not be transferred to the interior of the molded body, producing voids (large air bubbles) in the molded body. On the other hand, granular particles which do not be collapsed unless a large force is applied do not be collapsed under the molding pressure, and remain unchanged in the molded body.

As the result, the molded body contains voids and granular particles remaining unchanged, and has an uneven structure as a whole. Large voids remaining in the molded body do not disappear even during the following sintering process, and lower the properties of the sintered body. Since the granular particles remaining unchanged lack in adhesion to the surrounding structure, they produce voids around them after sintering.

The present invention was devised considering the effects of the variation factor of the compressive strength of each granular particle, and it is the object of the present invention to provide granulated powder for molding with a reduced variation factor to the extent that sintered bodies having preferred properties are stably produced.

SUMMARY OF THE INVENTION

According to the present invention, it is provided granular particles produced by granulating material powder, variation factor of the compressive strength of each of the granular particles being 0.3 or less.

According to another aspect of the present invention, it is provided a silicon nitride sintered body manufactured by providing granulated powder comprising granular particles produced by granulating material powder, variation factor (the standard deviation of strength/average strength) of the compressive strength of each of the granular particles being 0.3 or less, molding the granulated powder to obtain a molded body, and sintering the molded body.

According to another aspect of the present invention, it is provided a process for producing the granulated powder for molding, comprising; providing material powder, and granulating the material powder without adding organic binders.

According to still another aspect of the present invention, it is provided a process for producing the granulated powder for molding, comprising; providing material powder, and granulating the material powder by adding between 0.01 and 2 percent by weight of an organic binder.

DETAILED DESCRIPTION OF THE INVENTION

Granulated powder according to the present invention has a variation factor of the compressive strength of each granular particle of 0.3 or less, preferably 0.2 or less. In the present invention, "compressive strength" is a value calculated from the particle diameter of granular particle and load when the granular particle is collapsed (collapsed load) measured using a Shimadzu Micro Compression Tester (Shimadzu Seisakusho Ltd., MCTE-200) using the equation 1 below; and "the variation factor of compressive strength" is a value calculated from the above value using the equation 2 below.

$$\text{Compressive strength} = 2.8 \times (\text{collapsed load}) / \pi \times (\text{particle diameter})^2 \qquad \text{(Equation 1)}$$

$$\text{Variation factor of compressive strength} = (\text{standard deviation of the compressive strength of each granular particle/averaged compressive strength of granular particles}) \qquad \text{(Equation 2)}$$

By using granulated powder for molding with a small variation factor of the compressive strength of each granular particle, sintered bodies having preferred properties are obtained. The reasons for this are estimated as follows:

In the compression molding of granulated powder, a molding pressure is applied to each granular particle, which is collapsed and is compressed forming a molded body. If the variation factor of compressive strength is small, the granular particles are collapsed evenly when the pressure is applied, and the pressure is transmitted to the interior of the molded body, improving the density of the molded body, that is, decreasing the size and number of voids remaining in the molded body.

Granulated powder for molding with a small variation factor may be produced by accurately controlling the properties of the slurry for spray drying (temperature, viscosity, pH, etc.) or the properties of the organic binder added for granulating (concentration, average molecular weight, etc.). However, such a method is expensive because the control and measurement of all of these items are time consuming, and require high costs for purchasing equipment.

The inventors of the present invention repeated studies to find an easier manufacturing method, and succeeded to reduce the variation factor of the compressive strength of each granular particle composing granulated powder by performing the granulating process without adding any organic binders for granulating, which have been considered to be necessary, but to affect the compressive strength of granulated powder.

If the fluidity and particle distribution of granulated powder are lowered and moldability is degraded by not adding organic binders for granulating, the moldability is recovered while maintaining the variation factor at 0.3 or less by adding an organic binder for granulating within the range between 0.01 and 2 percent by weight. If the amount of the organic binder for granulating exceeds 2 percent by weight, the variation factor of the compressive strength of the granular particles increases due to the segregation of the organic binder for granulating, and such a granulated powder produces uneven molded bodies as described above.

The production of sintered bodies using granulated powder for molding of the present invention is not different from the conventional methods for producing sintered bodies, so that it can be performed by the conventional methods. However, when the granulated powder used has been produced without adding organic binders for granulating, the binder removing step, which is performed after molding the granulated powder in conventional manufacturing processes, can be omitted.

Granulated powder for molding according to the present invention can preferably be used for the production of various ceramic sintered bodies, especially for the production of silicon nitride sintered bodies used in various structural members as high-strength ceramics.

Silicon nitride sintered bodies produced by using granulated powder for molding of the present invention have a strength at room temperature of preferably 850 MPa or more, more preferably 950 MPa or more. The strength at room temperature used here means four-point flexural strength at normal temperature measured in accordance with JIS R 1601.

The present invention will be described in further detail referring to an example, below; however, the present invention is not limited to the example.

Example

To silicon nitride powder having an average particle diameter of 0.5 $\mu$m, 1.0 percent by weight of SrO powder, 4 percent by weight of MgO powder, and 5 percent by weight of $CeO_2$ powder were added as sintering additives, and water was further added and mixed to prepare a slurry. This slurry was spray dried using a spray drier to form granulated powder for molding having properties shown in Table 1. On spray drying of the slurry, an organic binder for granulating (polyvinyl alcohol) was added to a part of the slurry.

The resultant granulated powder for molding was press molded at a molding pressure of 300 MPa, and sintered in a nitrogen atmosphere at 1750° C. for one hour. The sample to which the organic binder for granulating was added was heated in the atmosphere to 500° C. for 20 hours to remove the binder before sintering. The strength of sintered bodies thus obtained was measured. The strength was measured by cutting a sample bar in accordance with JIS R 1601, and the four-point bending test was performed at normal temperature. The results are shown in Table 1.

TABLE 1

| No. | Amount of organic binder (PVA) (wt %) | Properties of granulated powder | | | | | Strength of sintered body (MPa) |
|---|---|---|---|---|---|---|---|
| | | Compressive strength | | | Density (g/cm³) | Average particle diameter ($\mu$m) | |
| | | Average strength (MPa) | Standard deviation | Variation factor | | | |
| Example | | | | | | | |
| 1 | Not added | 1.9 | 0.25 | 0.13 | 0.95 | 50 | 1150 |
| 2 | Not added | 1.5 | 0.18 | 0.12 | 0.93 | 48 | 1200 |
| 3 | Not added | 1.2 | 0.26 | 0.22 | 0.90 | 45 | 970 |
| 4 | Not added | 1.0 | 0.20 | 0.20 | 0.85 | 55 | 950 |
| 5 | Not added | 2.2 | 0.37 | 0.17 | 0.88 | 70 | 1050 |
| 6 | Not added | 1.7 | 0.39 | 0.23 | 1.05 | 90 | 900 |
| 7 | 0.5 | 2.6 | 0.73 | 0.28 | 0.95 | 65 | 870 |
| 8 | 1.0 | 2.9 | 0.87 | 0.30 | 0.86 | 75 | 850 |
| Comparative example | | | | | | | |
| 9 | 2.5 | 1.7 | 0.69 | 0.41 | 0.82 | 50 | 770 |
| 10 | 5.0 | 4.2 | 1.54 | 0.37 | 0.85 | 65 | 650 |
| 11 | 3.5 | 2.5 | 1.55 | 0.60 | 1.00 | 70 | 550 |

As Table 1 shows, sintered bodies of Examples produced using granulated powder for molding having variation factors of the compressive strength of each granular particle of 0.3 or less exhibited higher strength than sintered bodies of Comparative bodies produced using granulated powder for molding having variation factors exceeding 0.3.

As described above, by using granulated powder for molding of the present invention, sintered bodies with preferred properties, in particular with high strength can be produced stably. In the process for producing granulated powder for molding according to the present invention, granulated powder with the small variation factor of the compressive strength of each granular particle can easily be produced without accurately controlling manufacturing conditions by granulating without adding any organic binders for granulating, or adding a small amount of organic binders for granulating. Furthermore, since the silicon nitride sintered bodies of the present invention are produced using granulated powder for molding with a small variation factor, they excel in properties such as strength, and can preferably be used as various structural materials.

What is claimed is:

1. Granular particles for preparing a sintered body having a strength at room temperature of 950 Mpa or more and consisting essentially of silicon nitride and sintering additives of Sr, Ce, and Mg compounds, said particles having a standard deviation of strength/average strength of compressive strength of granular particles of 0.23 or less, and being obtained by spray drying a mixture consisting essentially of silicon nitride and Sr, Ce, and Mg compounds, said mixture being free of an organic binder.

* * * * *